United States Patent [19]
Camacho

[11] Patent Number: 5,544,597
[45] Date of Patent: Aug. 13, 1996

[54] PLASMA PYROLYSIS AND VITRIFICATION OF MUNICIPAL WASTE

[75] Inventor: Salvador L. Camacho, Raleigh, N.C.

[73] Assignee: Plasma Technology Corporation, Raleigh, N.C.

[21] Appl. No.: 521,129

[22] Filed: Aug. 29, 1995

[51] Int. Cl.$^6$ .................................................. F23G 5/02
[52] U.S. Cl. ..................... 110/223; 110/346; 414/187
[58] Field of Search ................................ 110/346, 218, 110/223, 109; 414/187, 198

[56] References Cited

U.S. PATENT DOCUMENTS

| | | | |
|---|---|---|---|
| 4,650,546 | 3/1987 | Le Jeune | 110/223 |
| 5,095,825 | 3/1992 | Arpalahti et al. | 110/109 |
| 5,453,164 | 9/1995 | Brev | 414/187 |

Primary Examiner—Noah P. Kamen
Attorney, Agent, or Firm—Olive & Olive, P.A.

[57] ABSTRACT

A system is disclosed in which municipal mixed solid waste is delivered to a processing facility where it is compacted before being placed into a reactor. The compaction apparatus serves to remove most of the air and some of the water from the waste as well as to seal the reactor against air infiltration. A transfer apparatus, in response to a signal relating to the height of waste in the reactor, sequentially deposits blocks of compacted waste in the top of the reactor when the height is low. The reactor has a pivotally and extensively mounted plasma arc torch as a heat source which is effective to pyrolyze organic waste components to generate desired by-product gases. Air and steam are added in controlled quantities to improve the operational efficiency and the by-product gas composition. The residual materials which do not pyrolyze are melted and cooled into a substantially inert vitrified mass.

9 Claims, 3 Drawing Sheets

PLASMA PYROLYSIS AND VITRIFICATION OF MUNICIPAL WASTE

FIELD OF THE INVENTION

This invention relates to a method for an ecologically acceptable reduction in volume of mixed waste, such as, for example, municipal waste, and more particularly to a method for the pyrolysis and vitrification of such waste by means of plasma arc heating technology.

BACKGROUND OF THE INVENTION

As technology progresses and the world becomes more populated, more waste is produced each day in homes, offices and industrial plants. In the past, waste has been dumped into landfills located near most municipalities or into the oceans, with little regard for the physical space consumed or the potential damage done to the environment. More recently land space allocation and environmental damage have become substantial public concerns.

The prior art, as does the present invention, recognizes that if waste is transported to a central location, pyrolysis and vitrification can be accomplished, utilizing plasma arc heating technology, in an efficient and safe manner and useful gaseous and vitrified products produced so as to avoid placing the waste residue into a landfill. The invention disclosed presents a versatile system for the handling of mixed waste which improves on earlier systems and which can be sized for the requirements of the particular quantity of waste to be processed.

As described in U.S. Pat. No. 5,280,757 and other prior art noted below, plasma arc heated processes are receiving considerable attention for waste treatment over fuel combustion heated processes because of several distinct advantages of plasma heat which is well suited for the pyrolysis and vitrification of waste materials. A plasma arc torch operates by supporting a high voltage electric arc on a flow of plasma (ionized) gas to generate an extremely hot "flame". The quantity of plasma gas flowing through the plasma torch is significantly less than the quantity of gas required to release the equivalent heat energy by the combustion of hydrocarbon fuels. A further difference and advantage of a plasma torch heat source over a combustion heat source is that the plasma torch can be used to produce useful by-product gases of higher caloric content referred to here as the degassing process. In addition, by virtue of the fact that a plasma arc torch uses only a small quantity of gas to support the arc and generate the heat, combustion is unlikely to occur spontaneously in the materials which are being heated. A major advantage of the plasma torch is that it is capable of unusually high rates of heat transfer, adding to its inherent efficiency. Also, the temperature of 4,000°–7,000° C. generated by a plasma torch is much hotter than that generated by a combustion source and is hot enough to melt any known material simultaneously with the pyrolysis degassing process.

An apparatus and method utilizing plasma arc heating for processing household and industrial waste in a plasma heated reactor is disclosed in U.S. Pat. No. 3,779,182 to the present inventor. The '182 patent is also noted for teaching the introduction of oxygen or air to the reactor. The teachings of the '182 patent are incorporated herein by reference.

The term "reactor" as used herein refers to the process containment vessel, or furnace, into which refuse, e.g. municipal solid waste, is placed and heat is added for the purpose of promoting the simultaneous pyrolysis of organics and vitrification of inorganics of the mixed wastes.

U.S. Pat. No. 5,143,000 to the present inventor describes a plasma arc heated furnace for the treatment of solid waste. Of interest to the present invention is the fact that the '000 patent teaches loading of non-compacted refuse through the top of a reactor. U.S. Pat. No. 5,280,757 to Carter et al. teaches a process for treating solid waste which includes feeding, compressing and forcing a stream of solid waste into the bottom of a reactor vessel heated with a plasma torch. The '757 patent also refers to injecting steam into the reactor. It has not been known, however, to provide a system in which a bulk supply of municipal solid waste is compacted into a substantially air-free elongated stream of substantially uniform cross section which is positioned above the top of the reactor and is discharged in increments as compressed blocks of waste into the top of the reactor. The present invention thus seeks to provide such a system.

Entrapped air, if permitted to enter the reactor with the solid waste, will allow combustion in an uncontrolled process and cause the resultant gases to be both different in nature and non-useful as compared to those resulting from pyrolysis of the organic waste materials alone in a substantially air-free environment. Through pyrolysis of organic waste, the by-product gases are principally components of valuable fuels such as hydrogen and carbon monoxide. The inclusion of a large quantity of air will add a significant quantity of nitrogen that will dilute the energy content of the gas. The present invention recognizes that the admission of a limited and controlled amount of air can be used to advantage, in conjunction with dropping increments of compacted waste of known size into the top of the reactor.

It is therefore an overall object of this invention to provide an improved process for plasma pyrolysis and vitrification, which reduces the volume of input mixed waste materials, and results in by-product gases which have high energy content that can be used.

It is a further object of this invention to provide an improved waste feeding system for use with the pyrolysis and vitrification of mixed waste.

It is an additional object of this invention to provide a system which pyrolyzes the organics of mixed waste including the wastes' moisture content and vitrifies the inorganics of mixed waste efficiently based on using an improved waste feeding system in conjunction with introducing controlled amounts of air and recycling the steam derived from the moisture content of the mixed wastes.

Other objects and advantages will be more fully apparent from the following disclosure and appended claims.

SUMMARY OF THE INVENTION

The system disclosed herein improves upon the type plasma arc powered reactor disclosed in the earlier patents noted. Mixed waste, such as municipal waste, is brought to the reactor site and placed into a supply bin. A compressing conveyor compacts and transports the waste from the bin toward the top portion of the reactor where a selected part of the compacted waste is dropped into the reactor when it is determined that the height of waste within the reactor is lower than desired. Through compaction of the waste prior to placing it into the reactor, the volume of the waste and the amount of air entrapped in the waste are significantly reduced, leading to an improved by-product gas composition. A plasma arc torch is pivotably suspended from an angled top plate of the reactor so that the torch resides perpendicular to the top plate when in its central angular position. Inlet tubes introduce a limited and controlled amount of air or other oxygen-containing gas to permit a controlled combustion in the reactor, thus reducing the energy required of the plasma torch. The rising hot fuel-laden gas preheats the down-flowing wastes and converts the wastes' moisture into steam. The steam is collected and is forced into the pyrolysis/vitrification zone, the interface of the plasma flame and the vitrified inorganics. The molten glass and metallics are tapped for recycling. The gases produced are channeled through a collection manifold to a scrubber/separator system.

DETAILED DESCRIPTION OF THE INVENTION

According to the objects of the invention described above, the reactor employed in the plasma pyrolysis and vitrification system is illustrated in FIGS. 1–5. A reactor housing 20 is constructed of refractory brick and is preferably formed substantially rectangular in exterior shape, with an interior configuration tapering inward to become narrower toward a hearth 26 at the lowest interior portion of the structure. Hearth 26 is in the form of a bowl and is adapted to receive molten waste materials which exit from hearth 26 through a tap 28. A preferred material for the refractory brick is aluminum oxide which exhibits high heat tolerance and excellent thermal insulative properties.

Figure 1:
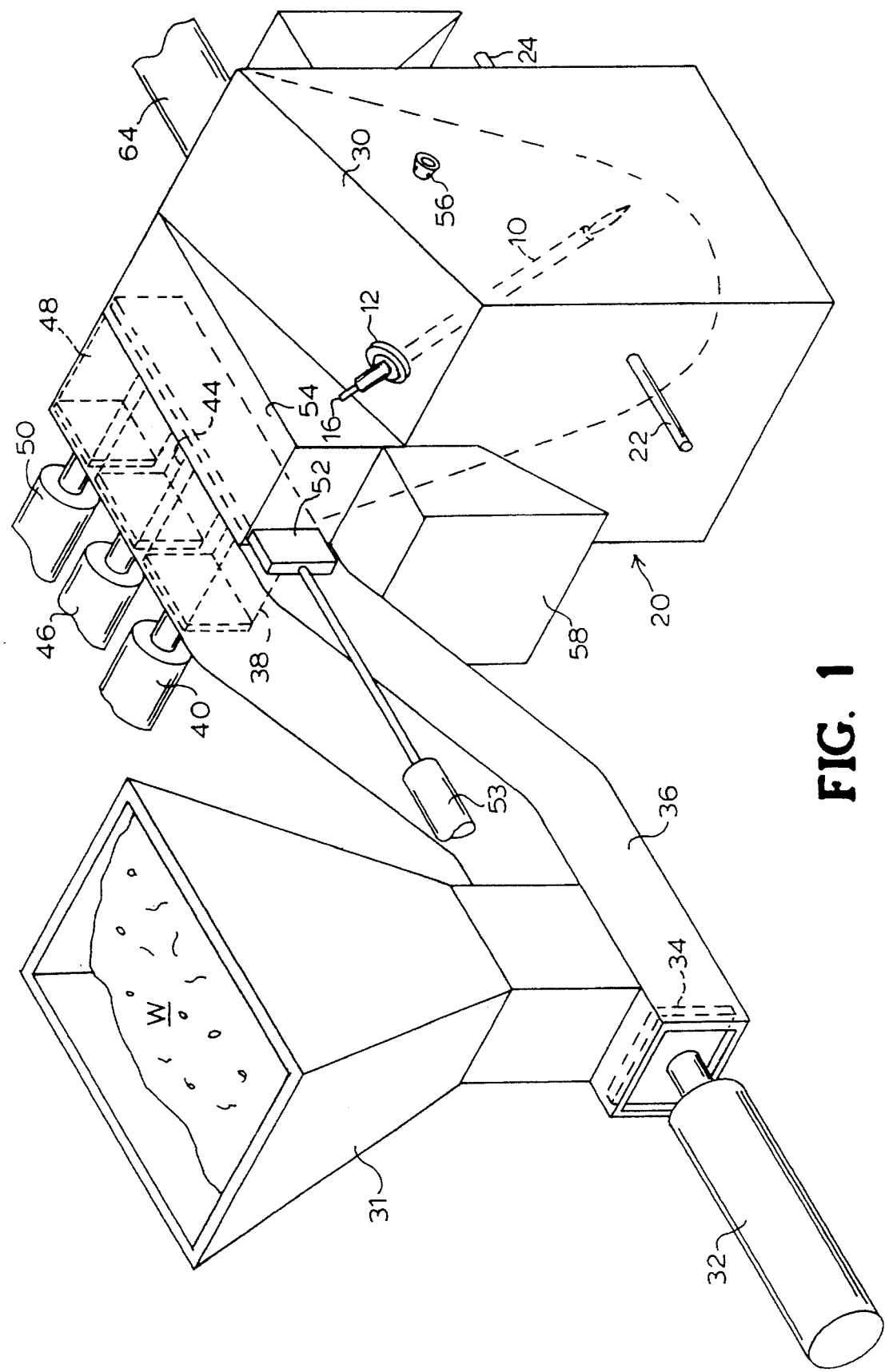
FIG. 1 is a perspective view of the system of the invention with waste compacting and top loading delivery apparatus connected to the reactor, the hearth being outlined and portions of the delivery apparatus being shown in dashed lines.
Figure 2:
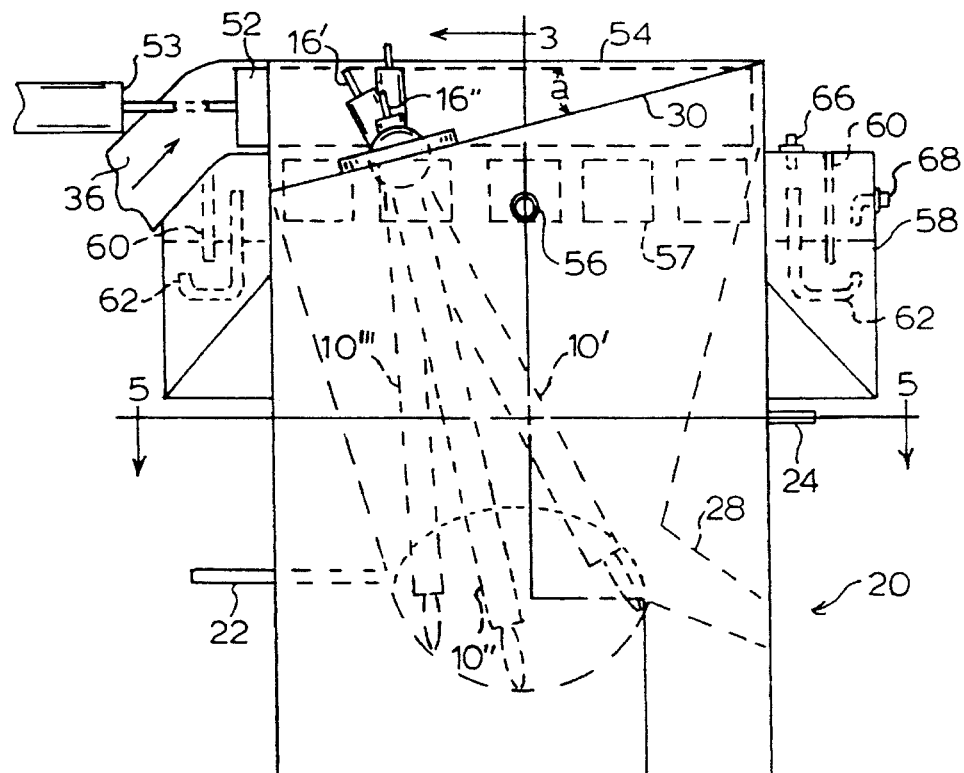
FIG. 2 is a front elevation view of the reactor of FIG. 1 with the hearth outlined and the torch being shown in various positions in dashed lines.

The top of reactor 20 above the hearth 26 is divided into two sections. Angular top panel 30 covers a first portion of reactor 20. Plasma arc torch 10 (FIG. 1) is mounted by means of a pivotally movable spherical mounting 12 to angular top panel 30. In its angularly central position, labeled 10" in FIG. 2, torch 10 resides approximately perpendicular to angular top panel 30. Thus, the angle of top panel 30 below horizontal is dependent on the height and width of reactor 20. In the preferred embodiment, an acute angle "a" (FIG. 2) is between about 15°–25°. When pivoted, torch 10 may be moved from position 10' to position 10''' (shown in dashed lines in FIG. 2) to direct its generated heat at various locations on hearth 26. The position of torch 10, labeled 10' in FIG. 2, is provided to permit the concentration of torch heat at tap 28 so as to allow melted waste to flow out from reactor 20. In coordination with its pivotability, torch 10 is extensible through spherical mounting 12 so as to maintain a consistent distance between the discharge end of torch 10 and hearth 26, see FIG. 2. The relation between the amount of torch 10 extension and its pivot angle is controlled by means of a microprocessor, not shown. Plasma arc torch 10 is generally supplied with electric power, cooling fluid and plasma gas through supply conduit 16 from appropriate sources, not shown. The power rating of torch 10, the capacity of the waste conveying and compacting apparatus and the size of the reactor 20 are all variable according to the type and volume of waste to be processed by the specific system. It is preferred to operate plasma torch 10 in the non-transferred mode with reversed polarity, i.e. with the internal terminal being positive. Horizontal top panel 54 (FIG. 1) covers the second portion of reactor 20. A gas stack 64 (FIGS. 2 and 4) connects the interior to the exterior of reactor 20 and then directs by-product gases to a suitable gas collection or processing system.

The delivery system of the invention is believed to be particularly unique. In this system, mixed waste W is supplied to a bin 31 from which it is moved under pressure by ram 34 which is driven linearly by hydraulic cylinder 32. The composition of the entrapped air between and within pieces of compacted mixed waste typically includes approximately 75% nitrogen. Nitrogen is an undesirable gas component in the process of the invention since it is not useful to produce the fuel end products contemplated, for example, hydrogen and carbon monoxide. As waste W is moved from bin 31 through supply chute 36 it becomes compacted and increased in density and is also elevated such that the compacted waste travels over the top of the reactor for discharge. These changes eliminate the major portion of air entrapped within and between pieces of raw, uncompacted waste. In addition, compaction of the waste W acts to seal supply chute 36 so as to prevent outside air from entering the reactor system, which is otherwise sealed against atmospheric air infiltration. The compaction performed according to the preferred embodiment also beneficially reduces the volume of waste W from about 75 to about 40 cubic feet per ton or less, thus increasing the mass per hour of waste which can be treated in a reactor of a particular size. Although the concept of compacting solid waste to be processed in a plasma arc heated furnace has been contemplated before, the present invention provides a unique combination of compacting waste and delivering selected segments of the compacted waste into the top of the reactor 20 rather than into the bottom of the furnace and directly into the melt as in the prior art.

As waste W is moved through chute 36 by the compacting forces of cylinder 32, waste W is also moved into a waste inlet position to enable the controlled introduction of individually compacted segments of waste into the top of reactor 20 in coordination with keeping the waste within the reactor at the same predetermined level. As shown in FIG. 1, highly compacted waste segments 38, 44, 48 at a first location in a continuous stream of compacted waste W are sequentially positioned adjacent waste transporters 40, 46 and 50 in the form of delivery cylinders. While it has been previously known to monitor the level of the waste being processed in a reactor, the ability to keep waste W reasonably level within reactor 20 in coordination with introducing compacted portions of waste adds to the overall efficiency and effectiveness of processing, according to the invention. Height checking sensor 56 (FIGS. 3 and 4) is provided to determine the height of waste W in reactor 20. Height sensor 56, in combination with a controller (not shown) acts to determine whether the waste W is below a desired height. Sensor 56 can be of the form of a light source and photosensitive cell, a television camera, or another type of device adapted to detect the presence of an object.

Figure 3:
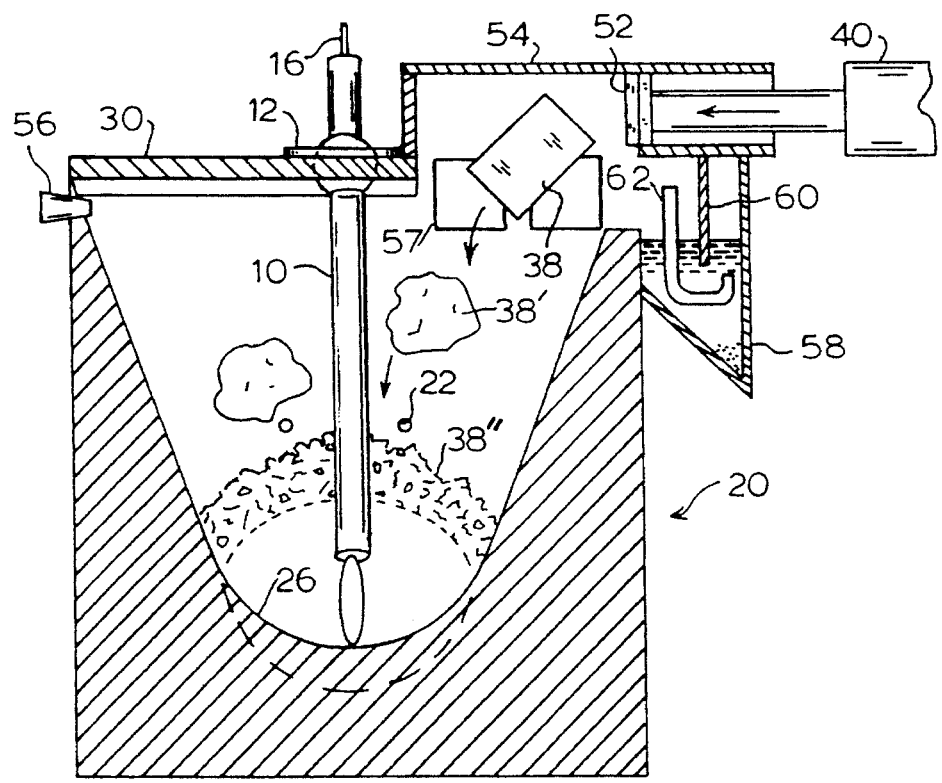
FIG. 3 is a cross sectional view of the reactor of FIG. 1 taken in the direction of line 3—3 of FIG. 2 and showing a block of compacted mixed waste material being dropped into the body of the reactor.

Sliding gate 52 is moved laterally by gate cylinder 53 to expose one or more of blocks 48, 44, 38, in sequence. While such blocks are illustrated in FIGS. 1 and 3 as having relatively smooth surfaces, such surfaces in practice assume a significantly rough texture. A signal indicative of the height information is transmitted to respective delivery cylinders 40, 46 and 50, one or more of which are activated in coordination with sliding gate 52 to push a block of waste 38 (FIG. 3) into reactor 20 at a second location below top panel 54. Compaction cylinder 32 is connected to the same controller as are waste delivery cylinders 40, 46 and 50 and gate cylinder 53 so that the various cylinder systems operate in coordination to avoid possible interference, all of which will be apparent to those skilled in the art. Immediately after each compacted waste block 38 is discharged from chute 36 in compacted condition, the waste in the block rapidly expands to a loose block 38' and ultimately returns to approximately its original volume of 75 cubic feet per ton as waste mass 38". It should be appreciated that because of the prior compaction of the waste, the amount of air and water introduced into the reactor by the waste is minimal.

The amount of water contained in waste W varies according to the waste composition and other factors. The process of compacting waste W as well as the pre-heating of incoming solid waste material within the reactor which naturally occurs by rising heat flow completely removes substantially all entrapped moisture in the waste. The pre-heating of incoming waste by rising heat benefits the process significantly because less heat energy is then required to effect pyrolysis and vitrification. A controlled amount of water, typically in the form of recycled steam removed from the waste or supplemental steam, is injected when desired through one or more steam inlet pipes 24 to follow the process depicted in the formula below. A plurality of steam inlet pipes 24, preferably one pipe 24 per 60° around the circumference of reactor 20, are provided though not shown for purposes of simplifying the illustration. In most cases, the recycled moisture content of the waste feed is adequate for promoting the complete pyrolysis of the waste organics.

A large proportion of the chemical composition of mixed waste comprises carbon, hydrogen and oxygen. Other components of the mixed waste are inorganic, and are not directly reactive. A typical sample of municipal solid waste would contain the following: $C_{30} H_{48} O_{19} N_{0.5} S_{0.05}$. The expected yield from chemical reactions induced by heating the mixed municipal waste and steam is depicted by the formula:

$$C_xH_y + H_2O \rightarrow CO + CO_2 + H_2$$

where $C_xH_y$ represents an arbitrary carbohydrate and the $H_2O$ component indicates the recycled steam. The hydrogen and carbon monoxide are useful fuel-gas by-products. Reduction of the quantity of nitrogen, such as by reducing included air by means of compaction, improves the makeup of the by-product gases as seen below. A typical comparative chemical analysis of a gas produced from pyrolyzed mixed waste introduced into the reactor in an uncompacted or a compacted condition yields a notable difference, as the chart of gas volume test results shows below:

| Chemical | Uncompacted Waste | Compacted Waste |
| --- | --- | --- |
| $H_2$ | 41% | 47% |
| CO | 30 | 35 |
| $N_2$ | 16 | 7 |
| $CO_2$ | 8 | 6 |
| Trace gas of complex hydro-carbons | 5 | 5 |

It will be noted that the reduction in the percentage of nitrogen achieved due to compaction results in an increase in the percentage of hydrogen and carbon monoxide, which are desired products needed in the manufacture of such fuels as methanol or $CH_3OH$.

A further efficiency has been accomplished by the invention disclosed by adding a small amount of air or other oxygen-containing gas to the reactor at a location above but proximate the flame of the plasma arc torch via an air inlet pipe 22, thus allowing a controlled combustion of waste organics to occur. It has been discovered that this controlled combustion contributes heat generation and reduces the amount of energy consumed by the operation of plasma torch 10. By introducing the blocks of compacted solid waste into reactor 20 from above and into the upper portion of the reactor, a level of waste is maintained above the flame end of plasma torch 10. Thus, the heat from torch 10 and additional heat generated by the controlled combustion will rise through the waste to pre-heat the incoming waste material. The heat added by combustion is useful mainly to reduce the amount of torch-generated heat needed to pyrolyze and vitrify the waste material. In particular, the energy consumption of a 150 kilowatt (kw) plasma arc torch has been reduced from approximately 580 kw to approximately 530 kw or less per ton of waste by the addition of 12 cubic feet of air to the reactor per ton of waste treated. It is recognized that an alternate method of promoting the desired combustion within reactor 20 is to supply plasma arc torch 10 with a plasma gas having an enriched oxygen component. Greater quantities of an oxygen-containing gas, however, have been determined to not yield proportional increases in input power-to-heat efficiency of the system.

Figure 4:
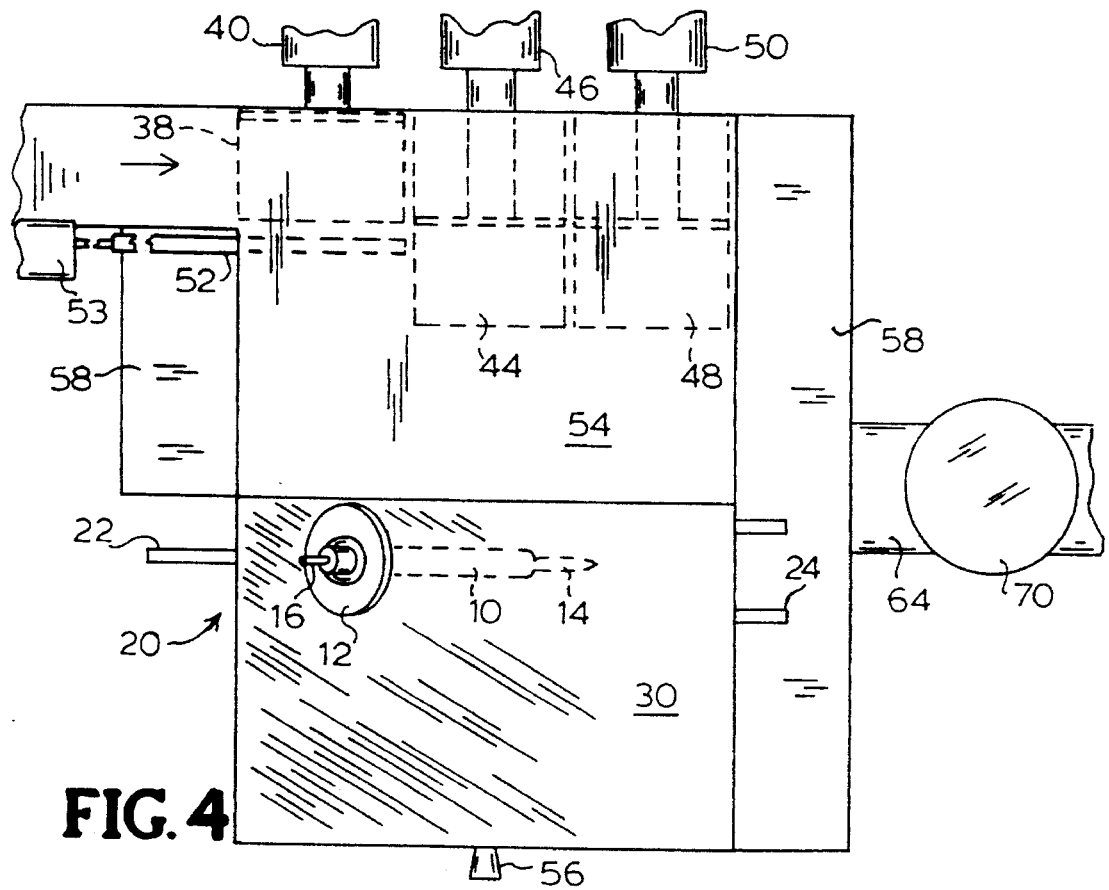
FIG. 4 is a top plan view of the reactor of FIG. 1 with portions of the torch and of the waste delivery apparatus being shown in dashed lines.
Figure 5:
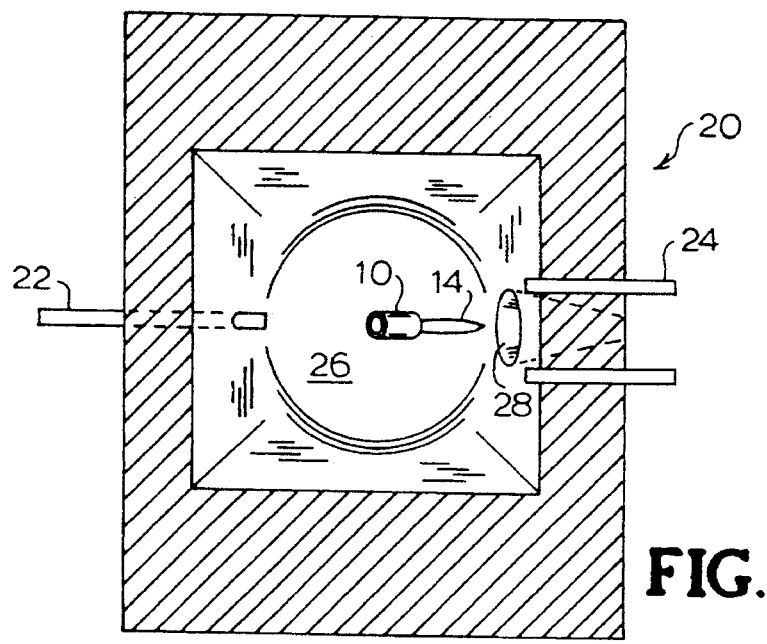
FIG. 5 is a cross sectional view of the reactor of FIG. 1 as taken in the direction of line 5—5 of FIG. 2.

As noted above, a major portion of the output from the process of the invention is in the form of gas, the balance being molten waste material which cools to a vitrified mass. The gases produced have a high energy value consisting of sensible heat energy due to their high temperature and calorific heat energy from the hydrogen and carbon monoxide. The hot product gases are exhausted from reactor 20 through manifold 58 generally disposed around the periphery of reactor 20, and stack 64 (FIGS. 2, 3 and 4). As the generated gas passes through vents 57 into manifold 58, it is forced through pipe 62 so as to transverse barrier 60 through a water bath fed by water supply 68. A pH sensor (not shown) generates a signal to activate pH adjustor 66 (FIG. 2) when required according to established levels, which serves to add lime and increase pH. After the water bath, the gas flows through duct 64 to a scrubber/separator 70 and then to a turbine generator (not shown) to generate electricity. The electricity produced is useful to feed plasma torch 10 or for other purposes. The molten waste may contain various amounts of silicates, radioactive elements, heavy metals, etc, which are effectively rendered safe by vitrification which encapsulates and immobilizes heavy metal components and radionuclides.

After the exhaust gas mixture has passed through the turbine generator, it will have lost its sensible heat. The cooler hydrogen and carbon monoxide gas is combusted to produce additional electricity.

The heat energy recovery consists of (1) the sensible heat from the plasma heater, and (2) the calorific heat from the hydrogen and carbon monoxide generated by pyrolysis of the waste organics. The sum of the sensible heat and the calorific heat is approximately equal to the energy content of the waste organics, or about 900 KWH per ton of wastes. The plasma heat required to effect the total recovery of the wastes' energy is approximately 500 KWH per ton of waste. Thus a net gain in the range of 400 KWH per ton of waste is realized.

As disclosed herein, the improved delivery system contributes to the plasma pyrolysis and vitrification system of the invention and provides an effective means for neutralizing the hazardous components and reducing the volume of mixed municipal waste products while achieving a positive energy production.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention as set forth in the claims which follow.

What is claimed is:

1. Apparatus for the pyrolysis and vitrification of mixed waste comprising:

(a) a reactor providing a waste processing chamber with a hearth at the bottom of the chamber and above said hearth enclosing top panel and side wall structure;

(b) delivery means for delivering said mixed waste to said reactor, comprising:

(i) a storage receptacle for receiving a bulk supply of mixed waste to be processed;

(ii) a compactor associated with said receptacle and operative to receive from said receptacle and compact successive quantities of said mixed waste with minimum entry of air and transfer said mixed waste as an elongated compacted mass of substantially uniform cross section to a first location proximate said top panel structure;

(iii) a waste inlet at a second location proximate said first location for receiving compacted waste to be processed within said reactor, said waste inlet being configured for receiving selected portions of said compacted waste removed from said elongated compacted mass; and (iv) a transporter operable in coordination with the forming of said elongated compacted mass of waste at said first location for moving said selected portions of said compacted elongated mass through said waste inlet into said chamber; and (c) an elongated plasma arc torch mounted in said chamber and providing a source of plasma heat at a discharge end thereof directed toward said hearth for the pyrolysis and vitrification of said waste delivered to said reactor.

2. The apparatus for the pyrolysis and vitrification of mixed waste as claimed in claim 1, wherein said selected portions moved by said transporter are of substantially uniform size and enter said chamber from said waste inlet as substantially uniform blocks of compacted waste.

3. The apparatus for the pyrolysis and vitrification of mixed waste as claimed in claim 1 including means for admitting controlled amounts of air in coordination with the moving of said selected portions through said waste inlet.

4. The apparatus for the pyrolysis and vitrification of mixed waste as claimed in claim 1 including means for admitting controlled amounts of steam in coordination with the moving of said selected portions through said waste inlet.

5. The apparatus for the pyrolysis and vitrification of mixed waste according to claim 2 including a sensor for measuring the level of waste in said chamber and coordinating the admission of said uniform blocks of compacted waste with said level.

6. The apparatus for the pyrolysis and vitrification of mixed waste as claimed in claim 1, wherein said plasma arc torch is pivotally mounted to said top panel structure of said chamber.

7. The apparatus for the pyrolysis and vitrification of mixed waste as claimed in claim 1, wherein at least a portion of said top panel structure is oriented at an acute angle with respect to horizontal.

8. The apparatus for the pyrolysis and vitrification of mixed waste as claimed in claim 1, further comprising an outlet for the removal of gas produced during pyrolysis from said apparatus positioned at an upper portion thereof.

9. The apparatus for the pyrolysis and vitrification of mixed waste as claimed in claim 8, wherein said outlet comprises a peripherally disposed manifold for collecting and conducting said gas from apparatus.

* * * * *